United States Patent
Suzuki et al.

[11] Patent Number: 6,145,821
[45] Date of Patent: Nov. 14, 2000

[54] CYLINDER-SHAPED VIBRATION ISOLATOR

[75] Inventors: Shingo Suzuki, Komaki; Satoru Hibi, Ichinomiya, both of Japan

[73] Assignee: Tokai Rubber Industries, Ltd., Komaki, Japan

[21] Appl. No.: 09/168,377

[22] Filed: Oct. 8, 1998

[30] Foreign Application Priority Data

Oct. 22, 1997 [JP] Japan .................................... 9-289519

[51] Int. Cl.[7] ............................. F16F 13/00; F16F 15/00; F16F 5/00; F16F 9/00
[52] U.S. Cl. ...................................... 267/140.12; 267/293
[58] Field of Search ........................ 267/140.11, 140.3, 267/141.2, 141.3, 141.4, 141.5, 140.12, 293

[56] References Cited

U.S. PATENT DOCUMENTS

| | | | |
|---|---|---|---|
| 5,178,375 | 1/1993 | Hamaekers et al. ................. | 267/141.2 |
| 5,435,516 | 7/1995 | Ogasawara et al. . | |
| 5,718,407 | 2/1998 | Lee ....................................... | 267/141.2 |

FOREIGN PATENT DOCUMENTS

| | | | |
|---|---|---|---|
| 0 647 787 | 4/1995 | European Pat. Off. . | |
| 406173988 | 6/1994 | Japan ................................. | 267/141.2 |
| 406213264 | 8/1994 | Japan ................................. | 267/141.2 |
| 7-243463 | 9/1995 | Japan . | |
| 1075043 | 7/1967 | United Kingdom . | |

*Primary Examiner*—Michael Mar
*Assistant Examiner*—Devon Kramer
*Attorney, Agent, or Firm*—Oblon, Spivak, McClelland, Maier & Neustadt, P.C.

[57] ABSTRACT

A cylinder-shaped vibration isolator includes an installation fitting, an inner cylinder-shaped fitting, a rubber elastic supporter, and elastic stoppers. The installation fitting includes a cylinder-shaped installation member. The rubber elastic supporter includes opposite elongation leading ends, extensions, and opposite leading end surfaces. The opposite elongation leading ends have a leading end surface. The extensions are extended from the opposite elongation leading ends in opposite circumferential directions substantially, and have a leading end surface. The opposite leading end surfaces are shared by the leading end surfaces of the opposite elongation leading ends and the extensions, are dented in a centripetal direction as a concaved curvature configuration, and are pressed against the inner periphery of the cylinder-shaped installation member. Because the opposite leading end surfaces of the opposite extension leading ends and the extensions are formed as a concaved curvature configuration, they are hardly separated from the inner periphery of the cylinder-shaped installation member even when a large rolling load is input into the cylinder-shaped vibration isolator. Thus, there scarcely arise the problems resulting from the separation, such as wear on the leading end surfaces of the opposite elongation leading ends and the extensions, and the foreign materials held between the leading end surfaces and the inner periphery of the cylinder-shaped installation member.

7 Claims, 3 Drawing Sheets

CYLINDER-SHAPED VIBRATION ISOLATOR

BACKGROUND OF THE INVENTION

1. Field of the Invention

The present invention relates to a cylinder-shaped vibration isolator which is interposed between a supporting member and a supported member of a vehicle to elastically inhibit the supported member from rolling. For instance, the cylinder-shaped vibration isolator is interposed between a vehicle body and an engine.

2. Description of the Related Art

As one of the conventional cylinder-shaped vibration isolators, a rolling mount for an engine has been known which is described in Japanese Unexamined Patent Publication (KOKAI) No. 7-243,463, for example. As illustrated in FIG. 6, the rolling mount includes an inner cylinder-shaped fitting 1, a rubber elastic supporter 2, and elastic stoppers 4. The inner cylinder-shaped fitting 1 is connected with one of a vehicle body and an engine. The rubber elastic supporter 2 is fixed to the outer periphery of the inner cylinder-shaped fitting 1, and elongates in opposite directions perpendicular to the axial direction of the inner cylinder-shaped fitting 1. Moreover, the rubber elastic supporter 2 is formed as a convexed curvature configuration at the opposite leading surfaces, and includes opposite extension pressing members 3 at the opposite elongation leading ends. The opposite extension pressing members 3 project in opposite circumferential directions substantially, and are formed integrally with the rubber elastic supporter 2. The elastic stoppers 4 are formed integrally with and projected from the opposite sides of the rubber elastic supporter 2 in opposite directions perpendicular to the opposite elongation directions of the rubber elastic supporter 2.

The conventional rolling mount is press-fitted into a circular installation hole of a bracket (not shown) at the leading end surfaces of the rubber elastic supporter 2, thereby completing a cylinder-shaped vibration isolator. The bracket is disposed on another of the vehicle body and the engine, and works as an installation member. In the completed cylinder-shaped vibration isolator, the elastic stoppers 4 are positioned so that they face the inner periphery of the circular installation hole in the input directions of the rolling loads.

In the conventional cylinder-shaped vibration isolator, the rubber elastic supporter 2 is press-fitted into the circular installation hole so that the opposite elongation leading ends produce an enlarged pressing area against the inner periphery of the circular installation hole. Moreover, the extension pressing members 3 of the rubber elastic supporter 2 further enlarge the pressing area. In addition, when a rolling load is input into the conventional cylinder-shaped vibration isolator, a compression stress arises in the rubber elastic supporter 2. Accordingly, the rubber elastic supporter 2 tries to stay at the pressing positions on the inner periphery of the circular installation hole. Thus, the conventional cylinder-shaped vibration isolator is inhibited from sliding on the inner periphery of the circular installation hole.

However, the oppositely elongating leading end surfaces of the rubber elastic supporter 2 are formed as a convexed curvature configuration which corresponds to the inner periphery of the circular installation hole. Consequently, when a large rolling load is input into the conventional cylinder-shaped vibration isolator during the acceleration or deceleration of a vehicle, there arises a problem in that the leading end surfaces of the rubber elastic supporter 2 are separated from the inner periphery of the circular installation hole. As a result, the leading end surfaces of the rubber elastic supporter 2 might be worn off, or foreign materials might get into the separation so that they are held between the leading end surfaces and the inner periphery of the circular installation hole.

SUMMARY OF THE INVENTION

The present invention has been developed in order to solve the aforementioned problems. It is therefore an object of the present invention to provide a novel cylinder-shaped vibration isolator which can inhibit leading end surfaces of a rubber elastic supporter from separating from an installation member.

A cylinder-shaped vibration isolator according to the present invention can carry out the object, and comprises:

an installation fitting including a cylinder-shaped installation member having an inner periphery, and being connected with one of a supporting member and a supported member of a vehicle;

an inner cylinder-shaped fitting fitted coaxially into the cylinder-shaped installation member of the installation fitting, having an outer periphery, and being connected with another one of the supporting member and the supported member of the vehicle;

a rubber elastic supporter fixed to the outer periphery of the inner cylinder-shaped fitting, and including opposite elongation leading ends, extensions, opposite leading end surfaces and opposite sides, the opposite elongation leading ends elongating in opposite directions perpendicular to the axial direction of the inner cylinder-shaped fitting, and having a leading end surface, the extensions being extended from the opposite elongation leading ends in opposite circumferential directions substantially, and having a leading end surface; and the opposite leading end surfaces being shared by the leading end surfaces of the opposite elongation leading ends and the extensions, being dented in a centripetal direction as a concaved curvature configuration, and being pressed against the inner periphery of the cylinder-shaped installation member of the installation fitting at the leading end surfaces of the opposite elongation leading ends and the extensions;

elastic stoppers formed integrally with and projected from the opposite sides of the rubber elastic supporter in opposite directions perpendicular to the opposite elongation directions of the opposite elongation leading ends of the rubber elastic supporter, and including a projection leading end, the projection leading end being disposed so as to provide a space between itself and the inner periphery of the cylinder-shaped installation member of the installation fitting.

In the thus constructed present cylinder-shaped vibration isolator, the opposite leading end surfaces of the opposite elongation leading ends and the extensions of the rubber elastic supporter are formed as a concaved curvature configuration against the inner periphery of the installation member of the installation fitting. Accordingly, when the rubber elastic supporter is press-fitted into the installation member, the opposite elongation leading ends and the extensions receive a large pressure from the facing inner periphery of the installation member. Then, the opposite leading surfaces of the opposite elongation leading ends and the extensions are flexed conversely to form a convexed curvature configuration, and are firmly adhered to the inner periphery of the installation member. When the thus flexed convexed curvature configuration tries to recover the original concaved curvature configuration, a large extra pressure arises in the rubber elastic supporter, and is added to the pressure which has been exerted to the installation member by the press-fitting. Consequently, the opposite elongation leading ends and the extensions are firmly adhered to the inner periphery of the installation member as a whole by the resultant remarkably large pressure. Hence, even when a large rolling load is input into the present cylinder-shaped vibration isolator, the opposite leading end surfaces of the opposite elongation leading ends and the extensions are hardly separated from the inner periphery of the installation member.

As a result, the present cylinder-shaped vibration isolator can securely avoid the problems which result from the wear on the leading end surfaces of the opposite elongation leading ends and the extensions, and which result from the foreign materials held between the leading end surfaces and the inner periphery of the installation member.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a farther understanding can be obtained by reference to the specific preferred embodiments which are provided herein for purposes of illustration only and are not intended to limit the scope of the appended claims.

Figure 1:
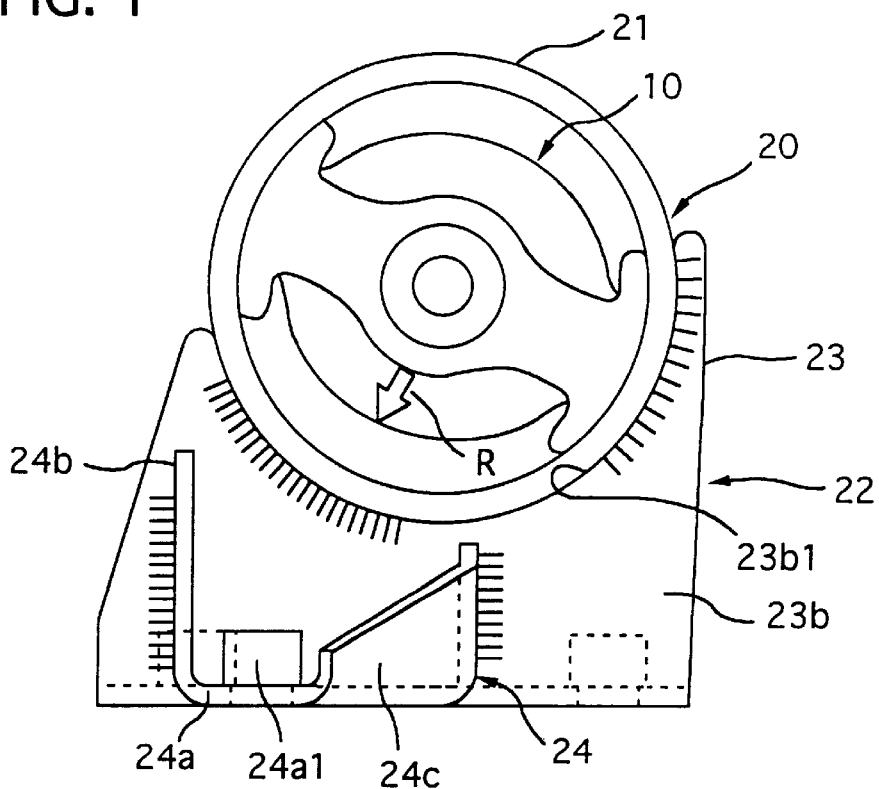
FIG. 1 is a front view for schematically illustrating a preferred embodiment of a cylinder-shaped vibration isolator according to the present invention.
Figure 2:
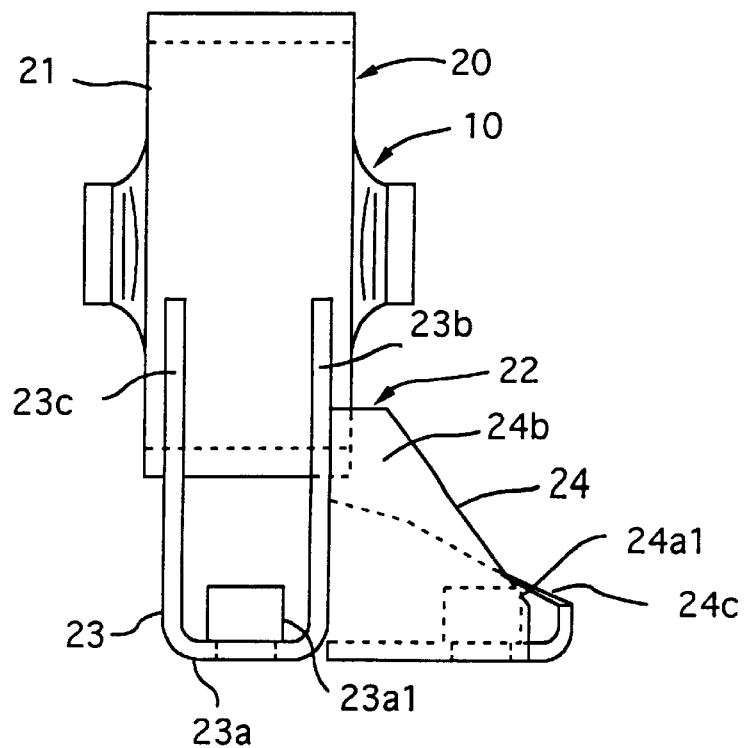
FIG. 2 is a left side view for illustrating the preferred embodiment.
Figure 3:
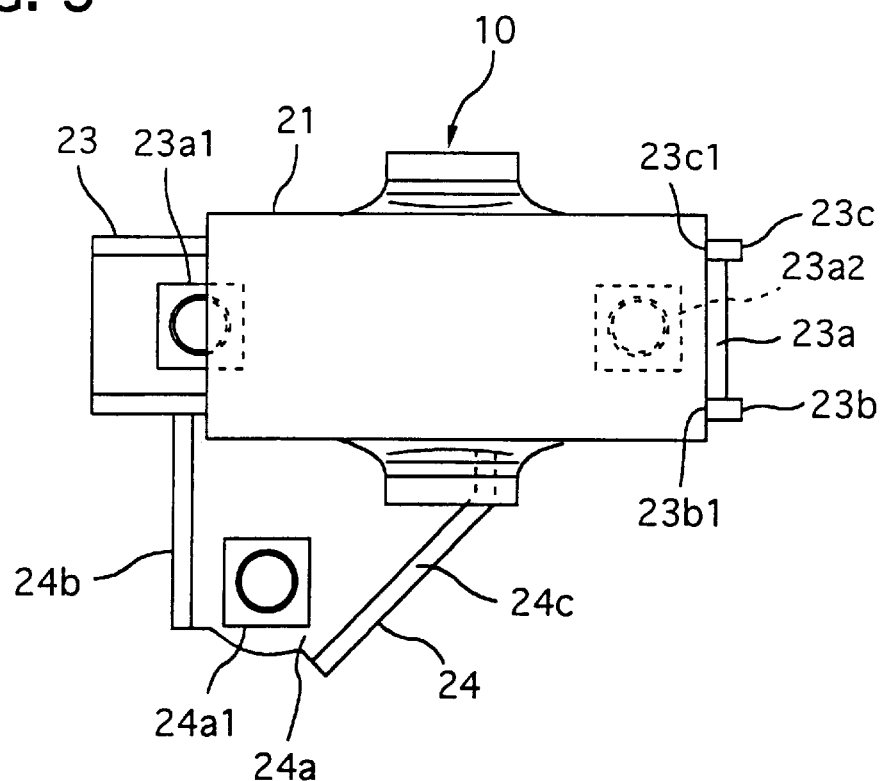
FIG. 3 is a plan view for illustrating the preferred embodiment.

A preferred embodiment of the present cylinder-shaped vibration isolator will be hereinafter described with reference to the accompanied drawings. FIGS. 1 through 3 are a front view, a side view and a plan view for illustrating the preferred embodiment of the present cylinder-shaped vibration isolator, respectively. The present cylinder-shaped vibration isolator is interposed between an engine and a body of an automobile. As illustrated in FIG. 1, the present cylinder-shaped vibration isolator includes a bushing 10, and an installation fitting 20. The bushing 10 is press-fitted into the installation fitting 20.

Figure 4:
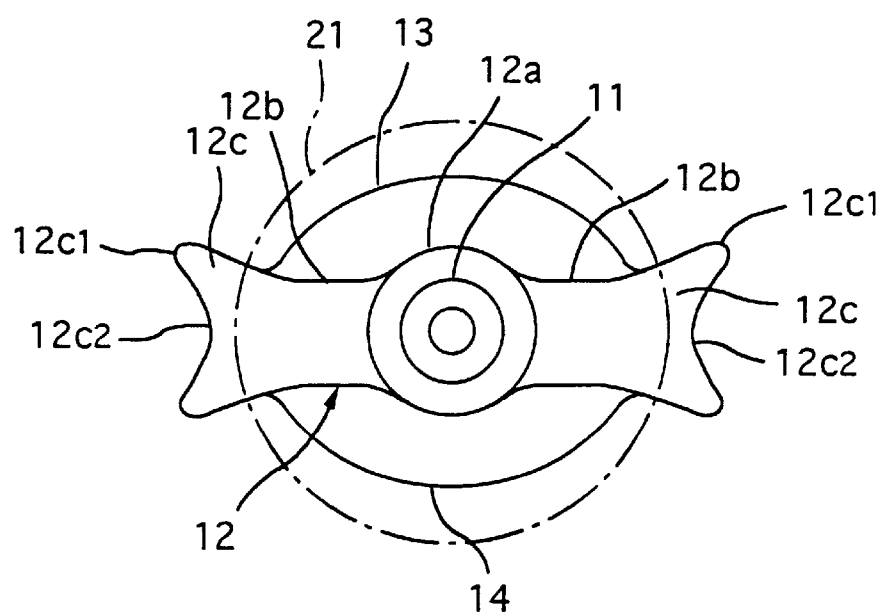
FIG. 4 is a front view for illustrating a bushing employed in the preferred embodiment.
Figure 5:
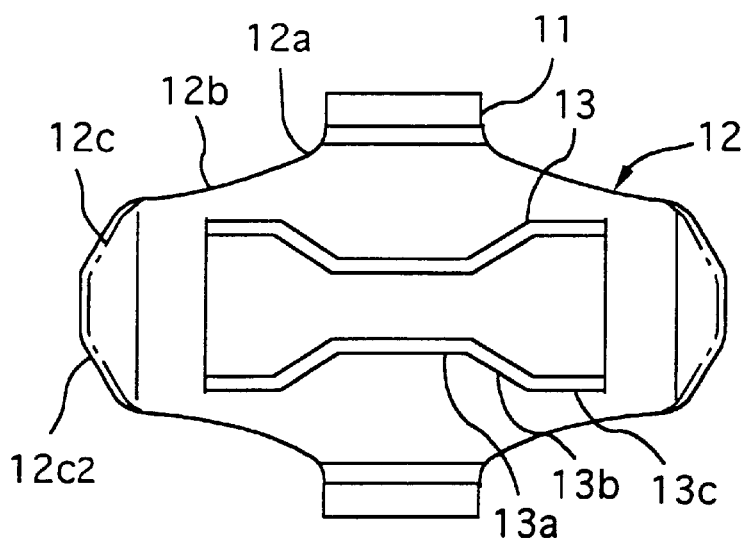
FIG. 5 is a plan view for illustrating the bushing.
Figure 6:
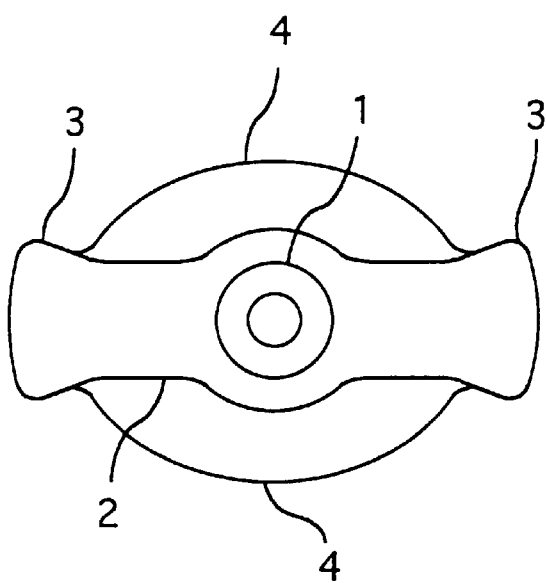
FIG. 6 is front view for illustrating a rolling mount (or a bushing) employed in a conventional cylinder-shaped vibration isolator.

As illustrated in FIGS. 4 and 5, the bushing 10 includes an inner cylinder-shaped fitting 11. The inner cylinder-shaped fitting 11 is installed to an engine or an automobile body. On the outer periphery of the inner cylinder-shaped fitting 11, there is fixed a rubber elastic supporter 12. The rubber elastic supporter 12 elongates in opposite directions perpendicular to the axial direction of the inner cylinder-shaped fitting 11 (i.e., in the horizontal direction of the drawing). Specifically, the rubber elastic supporter 12 includes an inner member 12a, intermediate members 12b, and opposite elongation leading ends 12c. The inner member 12 is formed as a cylinder shape. The inner member 12a is disposed around the inner cylinder-shaped fitting 11, and is fixed to the intermediate outer periphery of the inner cylinder-shaped fitting 11. The intermediate outer periphery herein means a portion of the inner cylinder-shaped fitting 11 which excludes the portions disposed adjacent to the axially opposite ends of the inner cylinder-shaped fitting 11. The intermediate members 12b are disposed outside the inner member 12a, and elongate in opposite directions so that the top and bottom surfaces are virtually parallel with each other in the drawing. The opposite elongation leading ends 12c are disposed outside the intermediate members 12b, and elongate in opposite directions. The opposite elongation leading ends 12c are provided with extensions $12c_1$. The extensions $12c_1$ project in opposite circumferential directions substantially. For example, the extensions $12c_1$ project from the top and bottom surfaces of the intermediate members 12b at an acute angle of about 35 deg., and expand gradually in the opposite circumferential directions toward the leading ends. Note that the angle of the projection can preferably fall in the range of from 15 to 50 deg. with respect to the top and bottom surfaces of the intermediate members 12b.

As illustrated in FIG. 4, the opposite elongation leading ends 12c are provided with a leading end surface $12c_2$. The leading end surfaces $12c_2$ are formed as a concaved curvature configuration which is dented along the circumferential direction substantially and inwardly in the radial directions toward the center of the bushing 10. As illustrated in FIG. 5, the opposite elongation leading ends 12c are formed as a trapezoid shape whose opposite sides are inclined with respect to the axial direction of the inner cylinder-shaped fitting 11. Further, as shown in FIG. 5, the rubber elastic supporter 12 is reduced gradually from the inner member 12a toward the opposite elongation leading ends 12c. Thus, the rubber elastic supporter 12 has a reduced width at the axially opposite ends. Furthermore, as can be appreciated from FIG. 4, the dimension between the opposite leading ends surfaces $12c_2$ of the rubber elastic supporter 12 is made slightly larger than the inside diameter of a cylinder-shaped installation member 21. The cylinder-shaped installation member 21 will be described in detail later. In FIG. 4, the alternate long and short dash line specifies the inner periphery of the installation member 21. For example, the dimension between the opposite elongation leading end surfaces $12c_2$ can preferably be larger than the inside diameter of the cylinder-shaped installation member 21 by a factor of from 1.03 to 1.25. Specifically, the concaved curvature configuration of the leading end surfaces $12c_2$ can be dented until its dented end coincides with the inner periphery of the installation member 21. Moreover, let the inside radius of the installation member 21 be "R", and the radius of the concaved curvature configuration of the opposite leading end surfaces $12c_2$ be "r", the ratio of the radius of "r" with respect to the inside radius "R" can preferably fall in the range of from 0.8 to 1.2.

As illustrated in FIG. 4, the opposite sides of the rubber elastic supporter 12 are expanded in the direction perpendicular to the axial direction of the inner cylinder-shaped fitting 11, and are provided with a pair of stoppers 13, 14 on the top and bottom in the drawing. The stoppers 13, 14 project from the opposite sides, and are formed as an arc-like mound shape. The stoppers 13, 14 hold the inner member 12a therebetween, and spread between the virtual boundaries where the opposite elongation leading ends 12c and intermediate members 12b of the rubber elastic supporter 12 meet. As illustrated in FIG. 5, the stopper 13 has an expanding axial width toward the rubber elastic supporter 12. In other words, the stopper 13 has top and bottom sides in the drawing, and the top and bottom sides expand toward the rubber elastic supporter 12 symmetrically with respect to the axial center line of the stopper 13 (i.e., the horizontal center line of the stopper 13 extending perpendicularly to the axis of the inner cylinder-shaped fitting 11 in the drawing). Specifically, the stopper 13 includes an intermediate member 13a, a pair of inclined members 13b, and a pair of outer members 13c. As shown in FIG. 5, the intermediate member 13a are positioned on the inner cylinder-shaped member 11. The inclined members 13b are made parallel with each other on their axial inner and outer sides, and have a reducing width toward the intermediate member 13a: namely; they are inclined axially outwardly toward their axial outer ends so that they have a gradually enlarging width toward the rubber elastic supporter 12. The outer members 13c are connected with the inclined members 13b at the virtual boundaries where the opposite elongation leading ends 12c and intermediate members 12b of the rubber elastic supporter 12 meet, and extend parallelly toward the elongation leading ends 12c. The stopper 14 has the same arrangements as those of the stopper 13. In addition to the arc-like mound shape, the stoppers 13, 14 can be formed as a truncated pyramid or a truncated cone which projects from the opposite sides of the rubber elastic supporter 12.

The thus constructed bushing 10 can be formed integrally with the inner cylinder-shaped fitting 11 by rubber vulcanization molding with a mold (not shown). Note that the inner cylinder-shaped fitting 11 is set in the mold in advance.

As illustrated in FIGS. 1 through 3, the bushing 10 is installed into the cylinder-shaped installation member 21 of the installation fitting 20 by press-fitting. Note that, in FIG. 1, the arrow "R" specifies the direction of the rolling load which is applied to the bushing 10 from the engine. The installation fitting 20 is provided with the installation member 21 and a bracket 22 for mounting. The bracket 22 is formed as a complicated configuration. Further, the bracket 22 is fastened to the outer periphery of the installation member 21 by welding, and is installed to either one of the automobile body and the engine. Furthermore, the bracket 22 is provided with a receptacle 23 to which the installation member 21 is attached. As illustrated in FIG. 2, the receptacle 23 is made by bending a metallic plate in a substantially letter "U" shape. The receptacle 23 is provided with a connector plate 23a, and a pair of bent members 23b, 23c. The bent members 23b, 23c are bent perpendicularly to the connector plate 23a. As can be appreciated from FIG. 3, on the opposite ends of the bent members 23b, 23c with respect to the connector plate 23a (i.e., the upper ends of the bent members 23b, 23c shown in FIG. 2), concaved receptacles $23b_1$, $23c_1$ are formed as an arc shape by cutting the bent members 23b, 23c as illustrated in FIG. 1. Moreover, as shown in FIG. 1, the concaved receptacles $23b_1$, $23c_1$ are extended higher at one of the opposite sides than the other one thereof. The installation member 21 is fastened to the concaved receptacles $23b_1$, $23c_1$ by welding the hatched areas specified in the drawing. As illustrated in FIG. 3, on the connector plate 23a, a fastener $23a_1$ is disposed at a position adjacent to one of the opposite ends of the connector plate 23a, and a fastener $23a_2$ is disposed at a position adjacent to the other one of the opposite ends thereof.

As illustrated in FIG. 1, a reinforcement 24 is further fastened to the bracket 22 by welding the hatched areas specified in the drawing. The reinforcement 24 is disposed at a position adjacent to the shortened-height side of the bent member 23b. As shown in FIGS. 1 through 3, the reinforcement 24 includes a bottom plate 24a, and a pair of bent plates 24b, 24c. As best shown in FIG. 3, the bottom plate 24a is formed as a right angled triangle whose acute-angle corner is truncated. The bent plate 24b is disposed on an opposite side with respect to the hypotenuse of the right angled triangle, and is bent at the opposite side by drawing perpendicularly to the bottom plate 24a. The bent plate 24c is bent at the hypotenuse by drawing perpendicularly to the bottom plate 24a. Moreover, as illustrated in FIG. 3, on the reinforcement 24, a fastener $24a_1$ is disposed at a position adjacent to the truncated end of the bottom plate 24a. Thus, the installation fitting 20 is fastened to either one of the automobile body and the engine at the fasteners $23a_1$, $23a_2$ and $24a_1$.

In the thus constructed preferred embodiment of the present cylinder-shaped vibration isolator, the leading end surfaces $12c_2$ of the opposite elongation leading ends 12c and the extensions $12c_1$ of the rubber elastic supporter 12 are formed as a concaved curvature configuration against the inner periphery of the installation member 21 of the installation fitting 20. Accordingly, when the rubber elastic supporter 12 is press-fitted into the installation member 21, the opposite elongation leading ends 12c and the extensions $12c_1$ receive a large pressure from the facing inner periphery of the installation member 21. Then, the opposite elongation leading ends 12c and the extensions $12c_1$ are flexed conversely to form a convexed curvature configuration, and are firmly adhered to the inner periphery of installation member 21.

In particular, when the thus flexed convexed curvature configuration of the opposite elongation leading ends 12c and the extensions $12c_1$ of the rubber elastic supporter 12 tries to recover the original concaved curvature configuration, an extra large pressure is added to the pressure which has been exerted to the installation member 21 by the press-fitting. Consequently, the opposite elongation leading ends 12c and the extensions $12c_1$ are firmly adhered to the inner periphery of the installation member 21 as a whole by the resultant remarkably large pressure. Hence, even when a large rolling load is input into the preferred embodiment of the present cylinder-shaped vibration insulator, the opposite elongation leading ends 12c and the extensions $12c_1$ are hardly separated from the inner periphery of the installation member 21.

As a result, the preferred embodiment of the present cylinder-shaped vibration isolator can securely avoid the problems which result from the wear on the opposite leading end surfaces $12c_2$ of the opposite elongation leading ends 12c and the extensions $12c_1$ of the rubber elastic supporter 12, and which result from the foreign materials held between the opposite leading end surfaces $12c_2$ and the inner periphery of the installation member 21.

Note that the arrangements of the present cylinder-shaped vibration isolator, such as the specific configuration, etc., are not limited to those of the preferred embodiment, but can be modified variously as the practical application may demand.

Having now fully described the present invention, it will be apparent to one of ordinary skill in the art that many changes and modifications can be made thereto without departing from the spirit or scope of the present invention as set forth herein including the appended claims.

What is claimed is:

1. A cylinder-shaped vibration isolator, comprising:
an installation fitting including a cylinder-shaped installation member having an inner periphery, and being connected with one of a supporting member and a supported member of a vehicle;
an inner cylinder-shaped fitting fitted coaxialy into the cylinder-shaped installation member of said installation fitting, having an outer periphery, and being connected with another one of the supporting member and the supported member of the vehicle;
a rubber elastic supporter fixed to the outer periphery of said inner cylinder-shaped fitting, and including opposite elongation leading ends, extensions, opposite leading end surfaces and opposite sides,
the opposite elongation leading ends elongating in opposite directions perpendicular to the axial direction of said inner cylinder-shaped fitting, and having a leading end surface,
the extensions being extended from the opposite elongation leading ends in opposite circumferential directions substantially, and having a leading end surface; and
the opposite leading end surfaces being shared by the leading end surfaces of the opposite elongation leading ends and the extensions, when in a non-compressed state being dented in a centripetal direction as a concaved curvature configuration, and when in a compressed state being pressed against the inner periphery of the cylinder-shaped installation member of said installation fitting at the leading end surfaces of the opposite elongation leading ends and the extensions.

2. The cylinder-shaped vibration isolator according to claim 1, wherein said rubber elastic supporter includes two pairs of the extensions, a first pair of the extensions being extended from one of the opposite elongation leading ends in opposite circumferential direction substantially, a second pair of the extensions being extended from another one of the opposite elongation leading ends in opposite circumferential direction substantially.

3. The cylinder-shaped vibration isolator according to claim 1, wherein the extensions are disposed symmetrically with respect to the opposite elongation directions of the opposite elongation leading ends.

4. The cylinder-shaped vibration isolator according to claim 1, wherein the extensions extend from the opposite elongation leading ends at an angle falling in the range of from 15 to 50 deg. with respect to the opposite sides of the rubber elastic supporter.

5. The cylinder-shaped vibration isolator according to claim 1, wherein said rubber elastic supporter has a predetermined dimension between the opposite elongation leading end surfaces, said cylinder-shaped installation member has a predetermined inside diameter, and the dimension is larger than the inside diameter by a factor of from 1.03 to 125.

6. The cylinder-shaped vibration isolator according to claim 1, wherein the concaved curvature configuration of the opposite leading end surfaces of said rubber elastic member is dented to have a predetermined radius, the cylinder-shaped installation member of said installation fitting has a predetermined inside radius, and a ratio of the radius of the concaved curvature configuration with respect to the inside radius of the cylinder-shaped installation member falls in the range of from 0.8 to 1.2.

7. The cylinder-shaped vibration isolator according to claim 1, further comprising elastic stoppers formed integrally with and projected from the opposite sides of said rubber elastic supporter in opposite directions perpendicular to the opposite elongation directions of the opposite elongation leading ends of said rubber elastic supporter, and including a projection leading ends, the projection leading end being disposed so as to provide a space between itself and the inner periphery of the cylinder-shaped installation member of said installation fitting.

* * * * *